US012764539B2

(12) United States Patent
Reeves et al.

(10) Patent No.: US 12,764,539 B2
(45) Date of Patent: Oct. 13, 2026

(54) MITIGATING MALICIOUS EXPLOITATION OF NETWORK DEVICES

(71) Applicant: T-MOBILE INNOVATIONS LLC, Overland Park, KS (US)

(72) Inventors: Raymond Emilio Reeves, Orlando, FL (US); Simon Youngs, Overland Park, KS (US); Mark Douglas Peden, Paola, KS (US); Thomas Michael Koch, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 386 days.

(21) Appl. No.: 18/379,017

(22) Filed: Oct. 11, 2023

(65) Prior Publication Data

US 2025/0126478 A1 Apr. 17, 2025

(51) Int. Cl.

*H04W 12/122* (2021.01)
*H04W 12/08* (2021.01)
*H04W 12/72* (2021.01)

(52) U.S. Cl.

CPC ......... *H04W 12/122* (2021.01); *H04W 12/08* (2013.01); *H04W 12/72* (2021.01)

(58) Field of Classification Search

None
See application file for complete search history.

(56) References Cited

U.S. PATENT DOCUMENTS

2016/0164831 A1* 6/2016 Kim .................... H04L 61/2589 709/223
2022/0014923 A1* 1/2022 Banjade ................... H04K 3/22

FOREIGN PATENT DOCUMENTS

| | | | |
|---|---|---|---|
| CN | 115866601 | A | 3/2023 |
| WO | 2021/234464 | A2 | 11/2021 |
| WO | 2023/279170 | A1 | 1/2023 |

OTHER PUBLICATIONS

Hasan et al., "Cross Layer Attacks on GSM Mobile Networks Using Software Defined Radios", 14th IEEE Annual Consumer Communications & Networking Conference, 2017, pp. 357-360.

International Search Report and Written Opinion received for PCT Patent Application No. PCT/US2024/050454, mailed on Dec. 11, 2024, 12 pages.

Zhao et al., "A Secure Wireless Information and Energy Cooperation Transmission Strategy in Spectrum Sharing Networks With Untrusted Dual-Relay", IEEE Access, vol. 7, 2019, pp. 115487-115504.

* cited by examiner

*Primary Examiner* — Frantz Bataille
(74) *Attorney, Agent, or Firm* — SHOOK, HARDY & BACON L.L.P.

(57) ABSTRACT

Systems and methods are provided for mitigating malicious attacks by IMSI-catchers. IMSI-catchers act as "fake" towers to intercept mobile device traffic and obtain private user data. These unauthorized devices pose a serious risk to user privacy. Aspects herein detect the presence of IMSI-catchers using RF footprints of cell sites to detect changes in RF footprint metrics that indicate the presence of IMSI-catchers. Once detected, beamforming techniques can be used to target a specific area surrounding the IMSI-catcher with a high-powered beamform that emits at a power level higher than the IMSI-catcher in order to reacquire any user devices that may have unknowingly connected to the IMSI-catcher.

20 Claims, 5 Drawing Sheets

MITIGATING MALICIOUS EXPLOITATION OF NETWORK DEVICES

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

In aspects set forth herein, systems and methods are provided for mitigating exploitation of user equipment (UE). More particularly, in aspects set forth herein, systems and methods enable detection of unauthorized devices/users (e.g., international mobile subscriber identity (IMSI) catcher devices) used to intercept telecommunications network traffic. These unauthorized devices wreak havoc on data security for unsuspecting or vulnerable users. Various products are available to aid in the detection of such unauthorized devices, but Mobile Network Operators (MNO) have an urgent need to identify a solution at the network level to aid in the prevention of these attacks.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
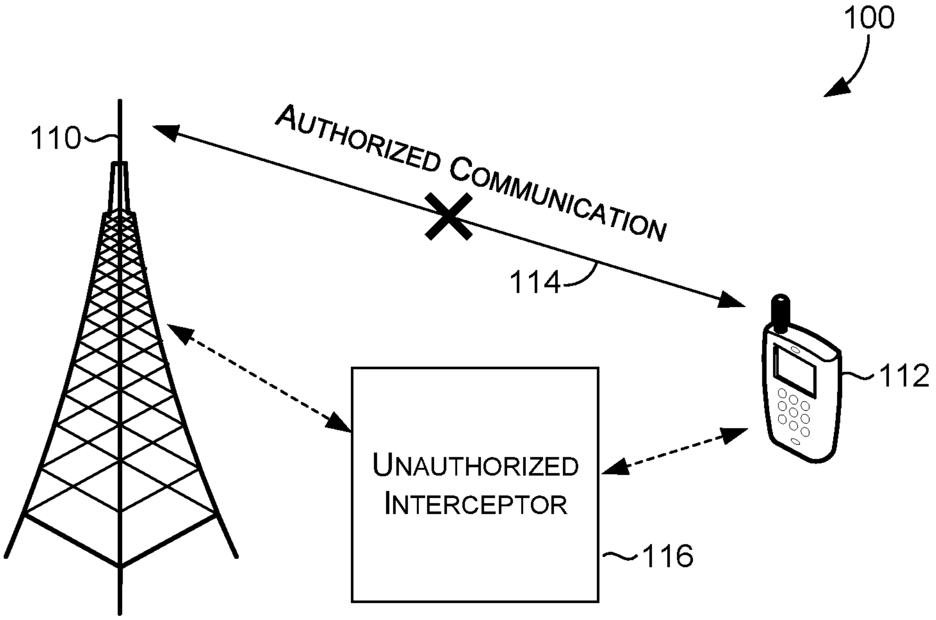
FIG. 1 PRIOR ART
FIG. 1 depicts a diagram of an exemplary malicious environment illustrating an attack on user equipment.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
AMF Access & Mobility Management Function
APN Access Point Name
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
IMSI International Mobile Subscriber Identity
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
ROM Read Only Memory
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment Further, various technical terms are used throughout this description. An illustrative resource that fleshes out various aspects of these terms can be found in Newton's Telecom Dictionary, 32d Edition (2022).

As used herein, the term "node" is used to refer to network access technology for the provision of wireless telecommunication services from a base station to one or more electronic devices, such as an eNodeB, gNodeB, etc.

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., cell sites, cell towers) to provide network coverage. The base stations are employed to broadcast and transmit transmissions to user devices of the telecommunications network. An access point may be considered to be a portion of a base station that may comprise an antenna, a radio, and/or a controller.

As employed herein, a UE (also referenced herein as a user device) or WCD can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antenna coupled to a radio for exchanging (e.g., transmitting and receiving) transmissions with a nearby base station.

In conventional cellular communications technology, a 5G telecommunications network comprises a 5G Core Network (5GC) and a gNB. The 5GC architecture, as known to those in the art, relies on a Service-Based Architecture (SBA) framework where the architecture elements are defined in terms of Network Functions (NF) rather than by traditional network entities. Using interfaces of a common framework, any NF can offer its services to other NFs that are permitted to make use of their functions. At times, the network interfaces can experience complete failures, degradations, and the like. This compromises the ability of other NFs to obtain necessary data to establish reliable sessions for UEs.

The present disclosure is directed to mitigating malicious attacks. More particularly, in aspects set forth herein, systems and methods enable detection of unauthorized devices/users (e.g., international mobile subscriber identity (IMSI)-catcher devices) used to intercept telecommunications network traffic. These unauthorized devices wreak havoc on data security for unsuspecting or vulnerable users. Various products are available to aid in the detection of such unauthorized devices, but Mobile Network Operators (MNO) have an urgent need to identify a solution at the network level to aid in the prevention of these attacks.

Accordingly, a first aspect of the present disclosure is directed to a system for mitigating malicious attacks. The system comprises one or more processors; and one or more computer-readable media storing computer-usable instructions that, when executed by the one or more processors, cause the one or more processors to: identify a radio frequency (RF) footprint for one or more cell sites, wherein the RF footprint comprises one or more RF footprint metrics; identify a change in at least one RF footprint metric of the one or more RF footprint metrics at a first cell site; based on the change in the at least one RF footprint metric, determine a presence of an unauthorized device; and initiate a dynamic power level adjustment to change a current power level of the first cell site to a power level higher than the current power level.

A second aspect of the present disclosure is directed to a system for mitigating malicious attacks. The system comprises one or more processors; and one or more computer-readable media storing computer-usable instructions that, when executed by the one or more processors, cause the one or more processors to: identify a radio frequency (RF) footprint for one or more cell sites, wherein the RF footprint comprises one or more RF footprint metrics; identify a change in at least one RF footprint metric of the one or more RF footprint metrics at a first cell site compared to a baseline RF footprint for the first cell site; identify a loss of service for a plurality of user devices at the first cell site; based on the change in the at least one RF footprint metrics and the loss of service, determine a presence of an unauthorized device; and initiate a dynamic power level adjustment to change a current power level of the first cell site to a power level higher than both the current power level and a power level associated with the unauthorized device.

Another aspect of the present disclosure is directed to a method for mitigating malicious attacks. The method comprises: identifying a radio frequency (RF) footprint for one or more cell sites, wherein the RF footprint comprises one or more RF footprint metrics; identifying a change in at least one of RF footprint metrics of the one or more RF footprint metrics at a first cell site; based on the change in the at least one RF footprint metrics, determining a presence of an unauthorized device; and initiating a dynamic power level adjustment to change a current power level of the first cell site to a power level higher than the current power level.

As background, an international mobile subscriber identity (IMSI) is a number that uniquely identifies every user of a telecommunications network. This unique number is associated with each mobile subscriber. An IMSI-catcher is an eavesdropping device used to intercept mobile network traffic and to track down a location for mobile users. The IMSI-catcher acts as a "fake" tower, or middle-man, between the target user device and a service provider's real tower.

FIG. 1 provides an example view of an environment 100 experiencing an attempt of malicious activity by an IMSI-catcher. The environment includes a service provider tower 110 and a user device 112 (also referred to herein as user equipment (UE)). The tower 110 and the UE 112 establish an authenticated session and communicate with one another via communication line 114. However, when an unauthorized interceptor 116 (i.e., an IMSI-catcher) is present, it acts like a "fake" tower and operates between the tower 110 and the UE 112 as the middle-man. As shown, the IMSI-catcher 116 terminates communication 114 between the tower 110 and the UE 112 and establishes new communication with the UE 112 by acting like the authorized tower. IMSI-catchers are used in a number of places by law enforcement and intelligence, but their use has raised significant privacy concerns.

Figure 2:
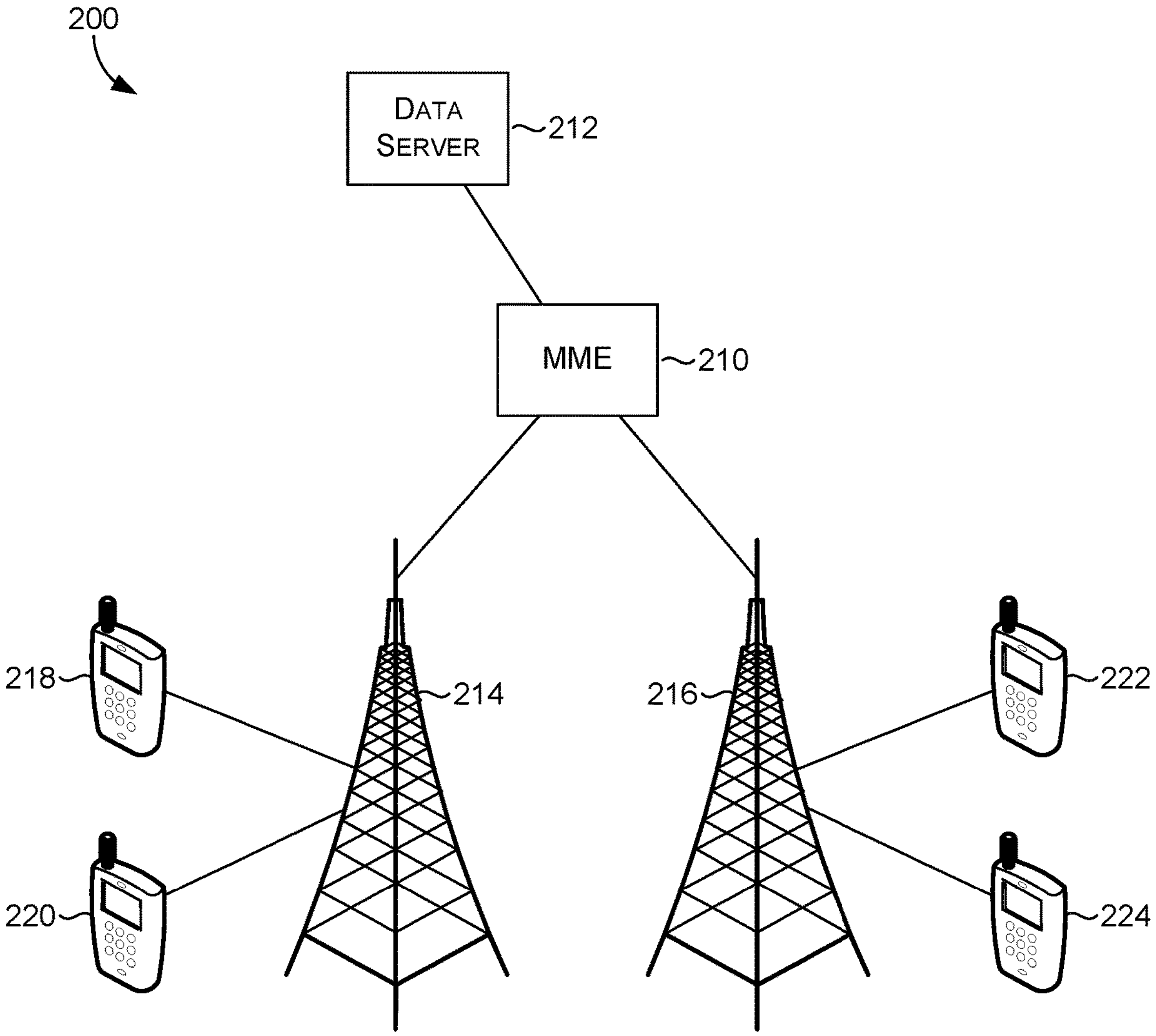
FIG. 2 depicts a diagram of an exemplary network environment in which implementations of the present disclosure may be employed, in accordance with aspects herein.

Turning to FIG. 2, a network environment suitable for use in implementing embodiments of the present disclosure is provided. Such a network environment is illustrated and designated generally as network environment 200. Network environment 200 is but one example of a suitable network environment and is not intended to suggest any limitation as to the scope of use or functionality of the disclosure. Neither should the network environment 100 be interpreted as having any dependency or requirement relating to any one or combination of components illustrated.

Figure 5:
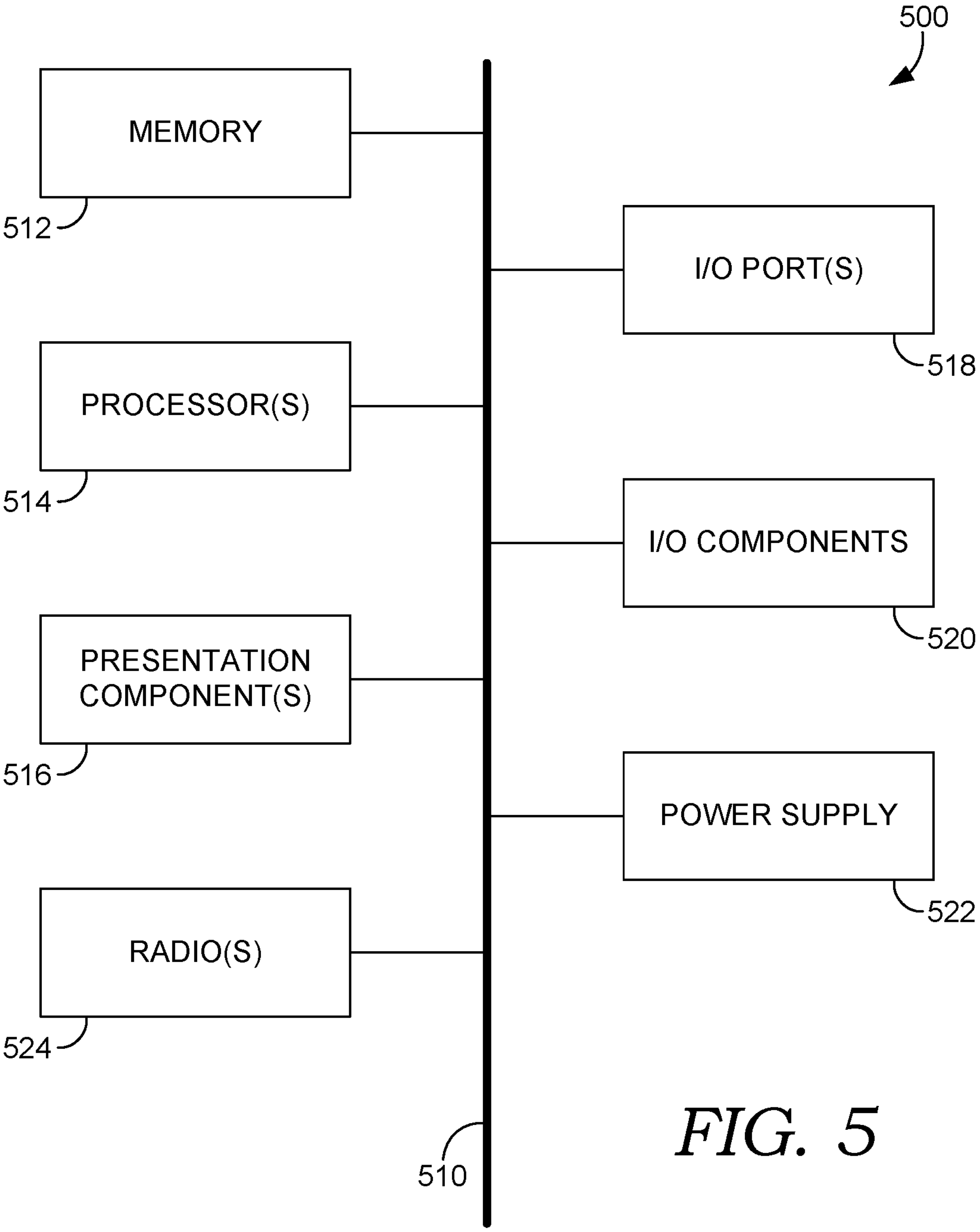
FIG. 5 depicts a diagram of an exemplary computing environment suitable for use in implementations of the present disclosure, in accordance with aspects herein.

A network cell may comprise a base station to facilitate wireless communication between a communications device within the network cell, such as communications device 500 described with respect to FIG. 5, and a network. As shown in FIG. 2, communications device may be UE 218, UE 220, UE 222, and UE 224. Throughout the description of FIG. 2, UE 218, UE 220, UE 222, and UE 224 may be simplified by only discussing a single UE (e.g., UE 218) in detail, understanding that any of the details provided with respect to UE 218 apply with equal force to UE 220, UE 222, and UE 224. In the network environment 200, UE 218 may communicate with other devices, such as mobile devices, servers, etc. The UE 218 may take on a variety of forms, such as a personal computer, a laptop computer, a tablet, a netbook, a mobile phone, a Smart phone, a personal digital assistant, or any other device capable of communicating with other devices. For example, the UE 218 may take on any form such as, for example, a mobile device or any other computing device capable of wirelessly communication with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, UE 218 comprises a wireless or mobile device with which a wireless telecommunication network(s) can be utilized for communication (e.g., voice and/or data communication). In this regard, the UE 102 can be any mobile computing device that communicates by way of, for example, a 5G network.

The UE 218 may utilize a network to communicate with other computing devices (e.g., mobile device(s), a server(s), a personal computer(s), etc.). In embodiments, the network is a telecommunications network, or a portion thereof. A telecommunications network might include an array of devices or components, some of which are not shown so as to not obscure more relevant aspects of the invention. Components such as terminals, links, and nodes (as well as other components) may provide connectivity in some embodiments. The network may include multiple networks. The network may be part of a telecommunications network that connects subscribers to their immediate service provider. In embodiments, the network is associated with a telecommunications provider that provides services to user devices, such as UE 218. For example, the network may provide voice services to user devices or corresponding users that are registered or subscribed to utilize the services provided by a telecommunications provider.

The telecommunications network may be accessible to the UE 218 via cell tower 210 (or tower 212 as it relates to UE 222 and UE 224). The cell tower 210 and 212 communicates with a Mobility Management Entity (MME) 214 in the instance of a 4G LTE network. In embodiments, the MME 214 can be replaced with any entity relevant for the respective network (e.g., an Access and Mobility Management Function (AMF) in a 5G Core network). The MME 214 can communicate with data server 216 which may be a data base or another network component providing relevant data needed by the MME 214. The data server 216 can provide scheduled outage events, maintenance schedules, and the like to the MME 214 to provide relevant data when reviewing a Radio Frequency (RF) footprint for each cell site/tower. An RF footprint is associated with each cell site in a network, such as cell tower 210 and cell tower 212. The RF footprint provides data related to network metrics and performance for each cell site including, but not limited to, network configuration information, network performance measurements, a number of users/UEs connected to the cell site, signal strength/power level, UE locations, and the like. The RF footprint can change under various conditions including capacity/load, weather, seasonal influences, etc.

As proposed herein, bad actors or unauthorized devices (i.e., IMSI-catchers) can be identified at the telecommunications network level by leveraging network data. In particular, the RF footprint and changes therein can be utilized to identify potential malicious activity and trigger mitigation efforts to initiate. The MME 214 is aware of the RF footprint for each cell tower for broadcast coverage in a specific area. The MME 214 can also identify anticipated changes from data received/obtained/retrieved from the data server 216. For instance, if a scheduled outage is known by the MME 214, an expected change in the RF footprint for a given site should be expected. Additionally, if a known event is occurring, such as a popular rock band concert or major sporting event, changes in the RF footprint can be anticipated.

In embodiments, these known events can be accounted for to avoid false positives. The MME 214 or the particular cell tower can self-calibrate the RF footprint to adjust for known events. For instance, if there is a scheduled outage, the RF footprint can be proactively calibrated to adjust the metrics that would be expected such that the changes in the RF footprint are not confused with malicious activity.

The change in one or more RF footprint metrics can be identified by the MME 214 by comparing the RF footprint to a known baseline footprint for the specific cell site. Exemplary changes that can be monitored include a change in a number of users connected to the cell site, a change in a number of users dropped from the cell site within a specific time period from one another, and the like. For example, if a number of users over a predetermined threshold drop from the cell site within a predetermined time period of one another, this may be determined to indicate malicious activity and the presence of an unauthorized device. Similarly, when a number of users connected to the cell site decreases past a predetermined threshold, it may be determined that an unauthorized device is the cause. When a change in at least one RF footprint metric is identified by the MME 214, a presence of an unauthorized device (i.e., IMSI-catcher) is determined. The RF footprint can be continuously monitored or evaluated at predetermined time intervals to monitor the activity of IMSI-catchers.

A presence of an IMSI-catcher can also be determined using UE feedback once the UE reconnects to the authentic tower. The UE feedback can include information obtained from the IMSI-catcher while the UE was connected such as the cell site ID, power level information, etc. Thus, when the UE reconnects to the network, the IMSI-catcher's information is known to the network.

IMSI-catchers, or unauthorized devices, generally emit a signal stronger than that of the authentic base station so that UEs in range will want to connect to the IMSI-catcher. The UEs identify a stronger signal and connect to the IMSI-catcher, unaware that the IMSI-catcher is not an authentic tower since there is no two-way authentication required.

Once an IMSI-catcher, or unauthorized device/interceptor, is identified, the MME 214 can initiate a dynamic power level adjustment of the cell site. The MME 214 can leverage MIMO beamforming techniques to adjust/increase the power level of a cell site and target an area associated with the IMSI-catcher. The MME 214 aims to increase the power level such that any UEs that unknowingly connected to the IMSI-catcher will identify the available higher power level and re-connect to the authentic cell tower instead of the IMSI-catcher.

The MME 214 can initiate a power level increase to a power level higher than a current power level for the cell site. The power level increase may also be to a power level higher than a power level of the IMSI-catcher if known from UE feedback. Leveraging MIMO beamforming techniques, an RF beam can be targeted to a specific endpoint such that they are tailed to attack the bad actor's efforts. This avoids increasing power for everyone in the broadcast coverage area and limits the power adjustment to only a predefined area associated with the IMSI-catcher.

As the MME 214 is continuously monitoring the presence of an IMSI-catcher, the power level adjustment can remain in effect for a predetermined period of time or until the IMSI-catcher is no longer detected on the network (i.e., the change in RF footprint metrics is no longer present, the IMSI-catcher drops from the network, etc.).

Once the IMSI-catcher is known, the MME 214 can create or update an exclusion list including the credentials of the IMSI-catcher (e.g., from the UE feedback data). The exclusion list can be communicated to any UE within the MME 214 broadcast coverage area to prevent the UEs from connecting to the IMSI-catcher in the future.

UE feedback data was previously mentioned as providing IMSI-catcher identifying information to the cell site and, in effect, the MME 214, such that the MME 214 can manage and prevent future connections to the IMSI-catcher. The UE feedback data can also be used to increase a probability score of future IMSI-catcher detections. In other words, the UE feedback data can be used as validating data (or not validating) that the detection of the IMSI-catcher was correct. The change in one or more RF footprint metrics associated with that particular UEs connection to the IMSI-catcher can be used to train a model to identify future bad actors. Thus, conditions (e.g., changes in RF footprint metrics) that match the known situation will have a higher confidence level of bad action prediction than those with previously unseen conditions.

Figure 3:
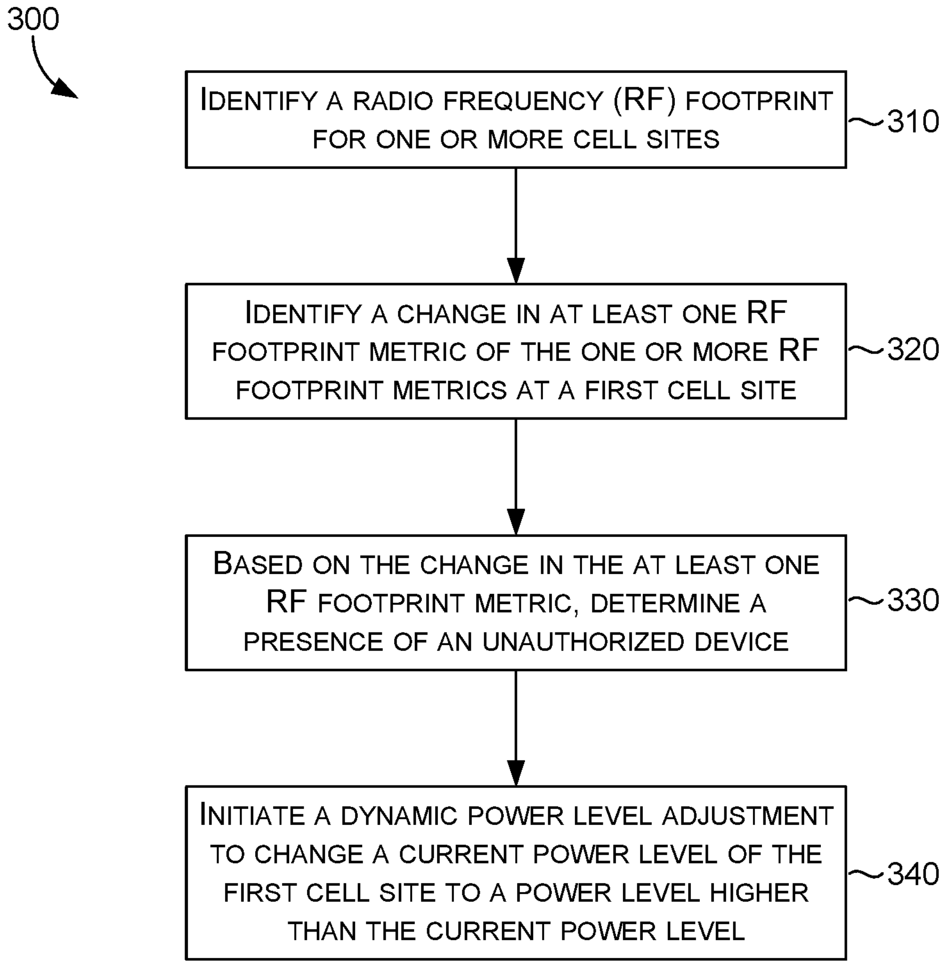
FIG. 3 depicts a flow diagram of a method for mitigating malicious attacks, in accordance with aspects herein.

Turning to FIG. 3, a flow diagram 300 is provided illustrating a flow to mitigate malicious activity. Initially, at block 310, a radio frequency (RF) footprint for one or more cell sites is identified. The RF footprint comprises one or more RF footprint metrics such a UEs connected, UEs served, time of day, signal strength, etc. At block 320, a change in at least one RF footprint metric of the one or more RF footprint metrics is identified at a first cell site. Based on the change in the at least one RF footprint metric, a presence of an unauthorized device is determined at block 330. At block 340, a dynamic power level adjustment is initiated to change a current power level of the first cell site to a power level higher than the current power level.

Figure 4:
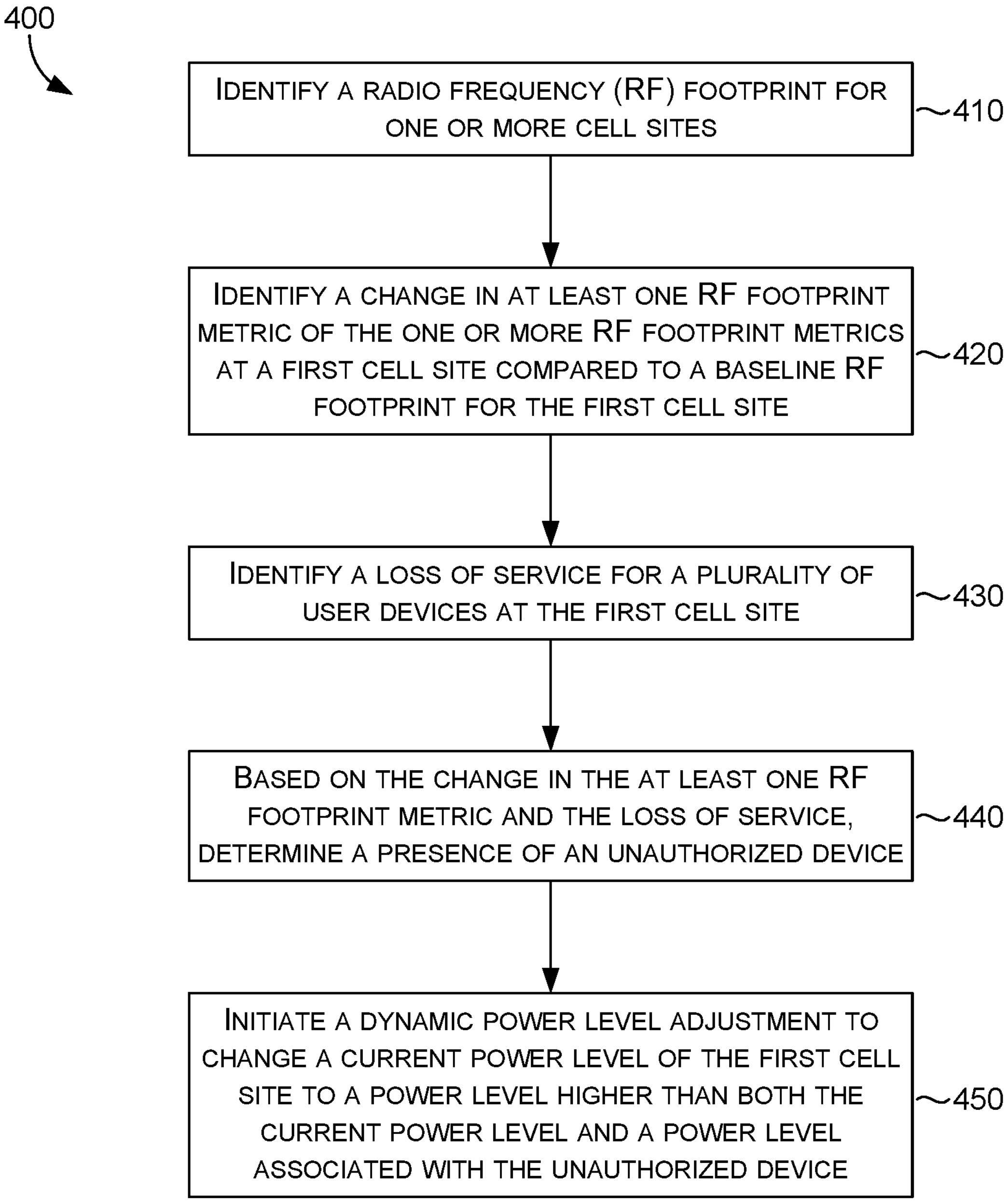
FIG. 4 depicts a flow diagram of a method for mitigating malicious attacks, in accordance with aspects herein.

Referring to FIG. 4, a flow diagram 400 is provided illustrating a flow to mitigate malicious activity. Initially, at block 410, a radio frequency (RF) footprint for one or more cell sites is identified. The RF footprint comprises one or more RF footprint metrics such a UEs connected, UEs served, time of day, signal strength, etc. At block 420, a change in at least one RF footprint metric of the one or more RF footprint metrics is identified at a first cell site compared to a baseline RF footprint for the first cell site. At block 430, a loss of service for a plurality of user devices is identified at the first cell site. The loss of service may be a dropped connection for the plurality of user devices. Based on the change in the at least one RF footprint metrics and the loss of service, a presence of an unauthorized device is determined at block 440. At block 450, a dynamic power level adjustment is initiated to change a current power level of the first cell site to a power level higher than both the current power level and a power level associated with the unauthorized device.

Referring to FIG. 5, a block diagram of an exemplary computing device 500 suitable for use in implementations of the technology described herein is provided. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated. It should be noted that although some components in FIG. 5 are shown in the singular, they may be plural. For example, the computing device 500 might include multiple processors or multiple radios. In aspects, the computing device 500 may be a UE/WCD, or other user device, capable of two-way wireless communications with an access point. Some non-limiting examples of the computing device 500 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 5, computing device 500 includes a bus 510 that directly or indirectly couples various components together, including memory 512, processor(s) 514, presentation component(s) 516 (if applicable), radio(s) 524, input/output (I/O) port(s) 518, input/output (I/O) component(s) 520, and power supply(s) 522. Although the components of FIG. 5 are shown with lines for the sake of clarity, in reality, delineating various components is not so clear, and metaphorically, the lines would more accurately be grey and fuzzy. For example, one may consider a presentation component such as a display device to be one of I/O components 520. Also, processors, such as one or more processors 514, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 512 may take the form of memory components described herein. Thus, further elaboration will not be provided here, but it should be noted that memory 512 may include any type of tangible medium that is capable of storing information, such as a database. A database may be any collection of records, data, and/or information. In one embodiment, memory 512 may include a set of embodied computer-executable instructions that, when executed, facilitate various functions or elements disclosed herein. These embodied instructions will variously be referred to as "instructions" or an "application" for short.

Processor 514 may actually be multiple processors that receive instructions and process them accordingly. Presentation component 516 may include a display, a speaker, and/or other components that may present information (e.g., a display, a screen, a lamp (LED), a graphical user interface (GUI), and/or even lighted keyboards) through visual, auditory, and/or other tactile cues.

Radio 524 represents a radio that facilitates communication with a wireless telecommunications network. Illustrative wireless telecommunications technologies include CDMA, GPRS, TDMA, GSM, and the like. Radio 524 might additionally or alternatively facilitate other types of wireless communications including Wi-Fi, WiMAX, LTE, 3G, 4G, LTE, mMIMO/5G, NR, VOLTE, or other VoIP communications. As can be appreciated, in various embodiments, radio 524 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

The input/output (I/O) ports 518 may take a variety of forms. Exemplary I/O ports may include a USB jack, a stereo jack, an infrared port, a firewire port, other proprietary communications ports, and the like. Input/output (I/O) components 520 may comprise keyboards, microphones, speakers, touchscreens, and/or any other item usable to directly or indirectly input data into the computing device 500.

Power supply 522 may include batteries, fuel cells, and/or any other component that may act as a power source to supply power to the computing device 500 or to other network components, including through one or more electrical connections or couplings. Power supply 522 may be configured to selectively supply power to different components independently and/or concurrently.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A system for mitigating malicious attacks, the system comprising:

one or more processors; and one or more computer-readable media storing computer-usable instructions that, when executed by the one or more processors, cause the one or more processors to:

identify a radio frequency (RF) footprint for one or more cell sites, wherein the RF footprint comprises one or more RF footprint metrics;

identify a change in at least one RF footprint metric of the one or more RF footprint metrics at a first cell site;

based on the change in the at least one RF footprint metric, determine a presence of an unauthorized device; and in response to determining the presence of the unauthorized device, initiate a dynamic power level adjustment to change a current power level of the first cell site to a power level higher than the current power level, wherein the dynamic power level adjustment causes one or more user devices that connected to the unauthorized device to reconnect to the first cell site.

2. The system of claim 1, wherein the at least one RF footprint metric is a decrease in a number of user devices connected to the first cell site.

3. The system of claim 1, wherein the change in the at least one RF footprint metric is identified based on a comparison to a historical baseline of RF footprint metrics for the first cell site.

4. The system of claim 1, further comprising reducing the power level higher than the current power level back to the current power level when the authorized device is no longer detected.

5. The system of claim 1, wherein the unauthorized device is an international mobile subscriber identity (IMSI)-catcher.

6. The system of claim 1, further comprising receiving feedback data from at least one user device that connected to the unauthorized device, wherein the feedback data includes at least an identifier of the unauthorized device.

7. The system of claim 6, further comprising creating an exclusion list including the identifier of the unauthorized device to prevent the at least one user device from connecting to the unauthorized device.

8. A system for mitigating malicious attacks, the system comprising:

one or more processors; and one or more computer-readable media storing computer-usable instructions that, when executed by the one or more processors, cause the one or more processors to:

identify a radio frequency (RF) footprint for one or more cell sites, wherein the RF footprint comprises one or more RF footprint metrics;

identify a change in at least one RF footprint metric of the one or more RF footprint metrics at a first cell site compared to a baseline RF footprint for the first cell site;

identify a loss of service for a plurality of user devices at the first cell site;

based on the change in the at least one RF footprint metrics and the loss of service, determine a presence of an unauthorized device; and in response to determining the presence of the unauthorized device, initiate a dynamic power level adjustment to change a current power level of the first cell site to a power level higher than both the current power level and a power level associated with the unauthorized device, wherein the dynamic power level adjustment causes one or more user devices of the plurality of user devices that connected to the unauthorized device to reconnect to the first cell site.

9. The system of claim 8, wherein the unauthorized action is an international mobile subscriber identity (IMSI)-catcher.

10. The system of claim 8, wherein the processor is further configured to receive feedback data from at least one user device of the plurality of user devices, wherein the feedback data includes at least an identifier of the unauthorized device.

11. The system of claim 10, wherein the processor is further configured to create an exclusion list including the identifier of the unauthorized device to prevent the at least one user device from connecting to the unauthorized device.

12. The system of claim 8, wherein the processor is further configured to communicate the exclusion list to the plurality of user devices.

13. The system of claim 8, wherein the processor is further configured to maintain the power level higher than both the current power level and a power level associated with the unauthorized device until the unauthorized device is not detected.

14. The method of claim 8, wherein the dynamic power level adjustment comprises transmitting a targeted beamform to an area surrounding the unauthorized device.

15. A method for mitigating malicious attacks, the method comprising:

identifying a radio frequency (RF) footprint for one or more cell sites, wherein the RF footprint comprises one or more RF footprint metrics;

identifying a change in at least one of RF footprint metrics of the one or more RF footprint metrics at a first cell site;

based on the change in the at least one RF footprint metrics, determining a presence of an unauthorized device; and in response to determining the presence of the unauthorized device, initiating a dynamic power level adjustment to change a current power level of the first cell site to a power level higher than the current power level, wherein the dynamic power level adjustment causes one or more user devices that connected to the unauthorized device to reconnect to the first cell site.

16. The method of claim 15, wherein the unauthorized action is an international mobile subscriber identity (IMSI)-catcher.

17. The method of claim 15, further comprising receiving feedback data from at least one user device that connected to the unauthorized device, wherein the feedback data includes at least an identifier of the unauthorized device.

18. The method of claim 17, further comprising creating an exclusion list including the identifier of the unauthorized device to prevent the at least one user device from connecting to the unauthorized device.

19. The method of claim 17, further comprising assigning a confidence level to unauthorized device detections based on the UE feedback data.

20. The method of claim 15, reducing the power level higher than the current power level back to the current power level when the authorized device is no longer detected.

* * * * *